United States Patent [19]
Tsutsui et al.

[11] Patent Number: 5,920,691
[45] Date of Patent: *Jul. 6, 1999

[54] COMPUTER NETWORK SYSTEM FOR COLLECTING DISTRIBUTED MANAGEMENT INFORMATION

[75] Inventors: Hiroshi Tsutsui, Chiyofu; Harumi Nukui, Yokohama, both of Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/680,819

[22] Filed: Jul. 16, 1996

Related U.S. Application Data

[63] Continuation of application No. 08/097,925, Jul. 28, 1993, abandoned, which is a continuation of application No. 07/551,784, Jul. 12, 1990, abandoned.

[30] Foreign Application Priority Data

Jul. 31, 1989 [JP] Japan ..................................... 1-198448

[51] Int. Cl.$^6$ ................................................. G06F 15/163
[52] U.S. Cl. ...................................................... 395/200.31
[58] Field of Search .......................... 707/10; 395/200.3, 395/200.31

[56] References Cited

U.S. PATENT DOCUMENTS

| | | | |
|---|---|---|---|
| 4,117,459 | 9/1978 | Douglas et al. | 395/185.08 |
| 4,156,798 | 5/1979 | Doelz | 364/133 |
| 4,412,285 | 10/1983 | Neaches et al. | 395/650 |
| 4,649,473 | 3/1987 | Hammer et al. | 395/200 |
| 4,694,396 | 9/1987 | Weisshaar et al. | 395/200 |
| 4,780,821 | 10/1988 | Crossley | 395/650 |
| 4,818,984 | 4/1989 | Chang et al. | 340/825.54 |
| 4,825,354 | 4/1989 | Agrawal et al. | 395/600 |
| 4,849,877 | 7/1989 | Bishop et al. | 395/200 |
| 4,901,231 | 2/1990 | Bishop et al. | 395/325 |
| 4,914,583 | 4/1990 | Weisshaar et al. | 395/600 |
| 5,003,538 | 3/1991 | Lee et al. | 371/32 |
| 5,014,192 | 5/1991 | Mansfield et al. | 395/600 |
| 5,031,089 | 7/1991 | Liu et al. | 395/725 |
| 5,046,189 | 9/1991 | Kainvma | 379/100 |
| 5,055,999 | 10/1991 | Frank et al. | 395/490 |
| 5,060,150 | 10/1991 | Simor | 364/200 |
| 5,077,732 | 12/1991 | Fischer et al. | 370/85.4 |
| 5,109,486 | 4/1992 | Seymour | 395/200 |
| 5,109,515 | 4/1992 | Laggis et al. | 395/725 |
| 5,123,089 | 6/1992 | Beilinski et al. | 395/200 |
| 5,133,053 | 7/1992 | Johnson et al. | 395/200.53 |
| 5,167,035 | 11/1992 | Mann et al. | 395/575 |
| 5,175,852 | 12/1992 | Johnson et al. | 707/8 |
| 5,301,339 | 4/1994 | Boasson | 395/800 |
| 5,408,610 | 4/1995 | Arakawa | 395/200 |
| 5,421,012 | 5/1995 | Khoyi et al. | 395/650 |

OTHER PUBLICATIONS

Christian, K., The UNIX Operating System, John Wiley & Sons, Inc., pp. 236–247, 287 and 300.

Birrell, A.D., et al. "Implementing Remote Procedure Calls," ACM Transactions on Computer Systems, vol. 2, No. 1, pp. 39–59 (Feb. 1984).

*Primary Examiner*—Jack M. Choules
*Attorney, Agent, or Firm*—Banner & Witcoff, Ltd.

[57] ABSTRACT

A computer network includes a plurality of computer nodes each including a file system and a central processing unit usable by other computer nodes and which are connected to each other via a communication medium. Each respective computer node has a capability of issuing a transfer request requesting management information, including user log-in information, active process information, and so forth, to another computer node over the communication medium. The computer node receiving the transfer request collects its own management information and transfers it to the computer node which issued the transfer request through the communication medium.

15 Claims, 4 Drawing Sheets

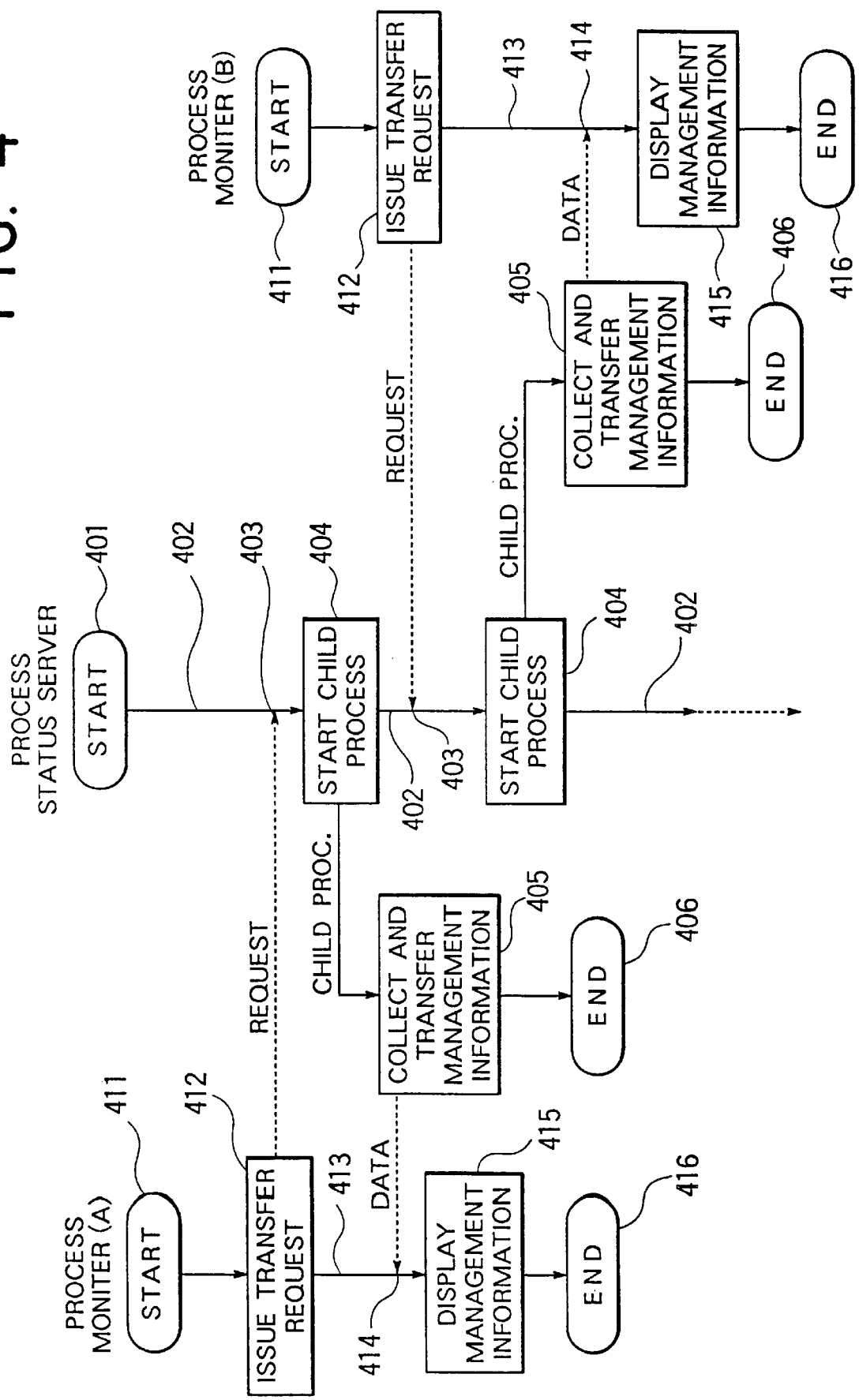

COMPUTER NETWORK SYSTEM FOR COLLECTING DISTRIBUTED MANAGEMENT INFORMATION

This application is a continuation of application Ser. No. 08/097,925, filed Jul. 28, 1993, now abandoned which is a continuation of Ser. No. 07/551,784 filed Jul. 12, 1990 now abandoned.

FIELD OF THE INVENTION AND RELATED ART STATEMENT

The present invention relates to a computer network system and in particular, relates to a computer network system for collecting management information of any node of the network.

Generally, a computer network system is structured with a plurality of computer systems being connected with each other through a communication medium so that file systems and CPUs in the computer systems can be used.

In such a conventional computer network system, the management information including user log-in information, active process information, and so forth is accumulated and managed integratedly by the master node.

In the conventional computer network system described above, since the master node integratedly manages all the information, if the master node fails to work due to a malfunction, halt, and the like, the information cannot be monitored at all.

OBJECT AND SUMMARY OF THE INVENTION

An object of the present invention is to provide a computer network system wherein the management information can be collected from any node in the network.

Another object of the present invention is to provide a computer network system wherein the management information of only currently active nodes can be collected regardless of whether each node in the network is active or inactive.

In other words, in the computer network system according to the present invention, a plurality of computer systems are connected with each other through a communication medium and the file systems and CPUs of these computer systems can be mutually used. Each computer system comprises a means for issuing a transfer request of the management information including user log-in information, active process information, and so forth to another computer system through the communication medium and a means for receiving a transfer request from the other computer system, collecting its own management information, and transferring it to the computer system which issued the transfer request through the communication medium.

BRIEF DESCRIPTION OF DRAWINGS

FIG. 4 is a flowchart showing a communication procedure accomplished between the process monitor and the process status server shown in FIG. 1.

DETAILED DESCRIPTION OF PREFERRED EMBODIMENT

Now, by referring to the attached drawings, an embodiment of the present invention will be described in detail.

Figure 1:
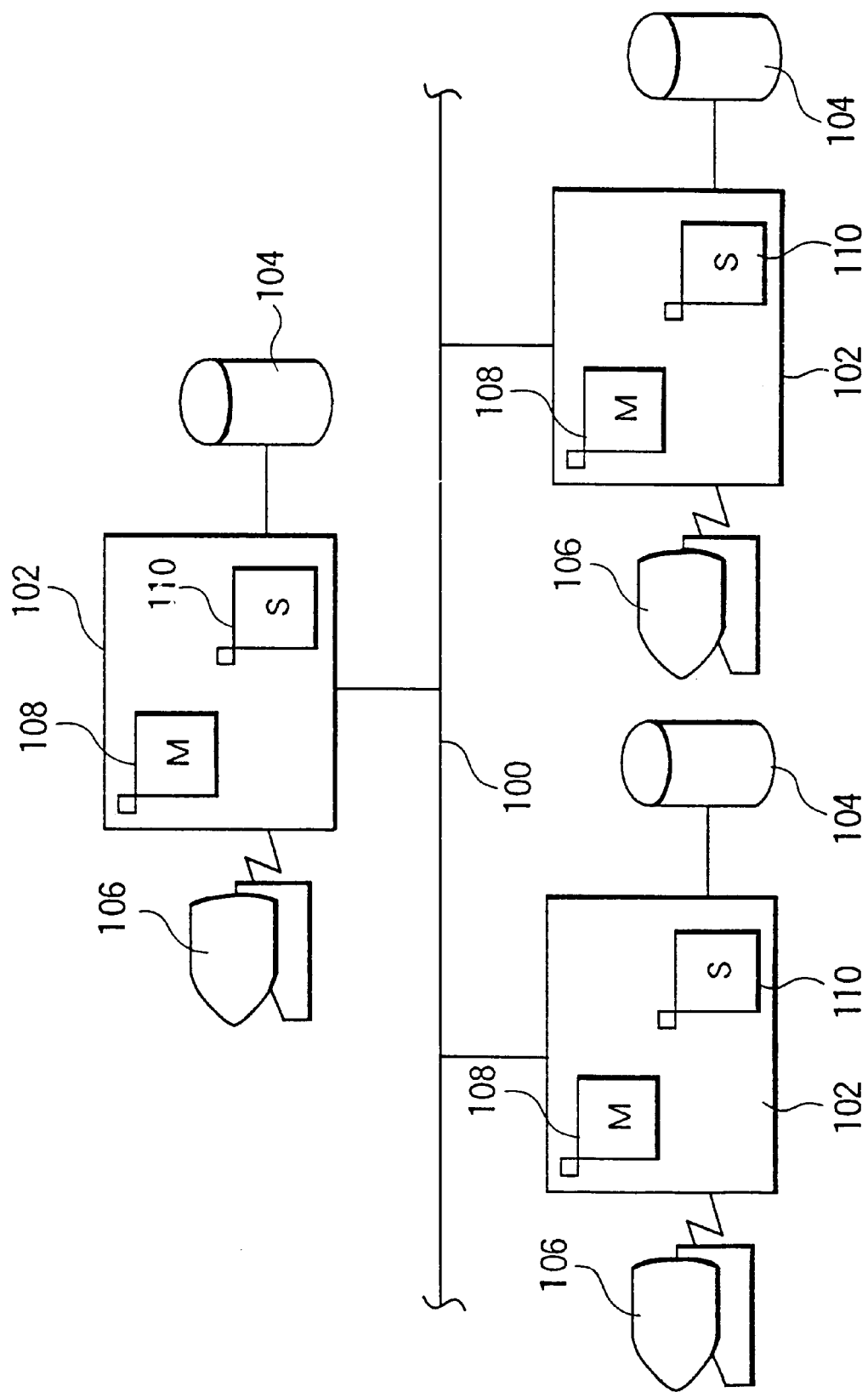
FIG. 1 is a block diagram of a network system according to an embodiment of the present invention.

FIG. 1 is a block diagram of a network system according to an embodiment of the present invention.

In the figure, numeral 100 represents a communication medium. By connecting a plurality of computer systems 102 to the communication medium 100, a computer network system is structured. Each computer system 102 comprises a file system 104 and a CRT/keyboard terminal 106. Each computer system 102 includes a file system 104 and a CPU (not shown) usable by other computer systems in the computer network.

In the computer system 102 described above, an OS (operating system) installed therein stores user log-in information as files.

Each computer system 102 is provided with two types of processes: process monitor 108 which works as a client and process status server 110 which works as a server.

Figure 2:
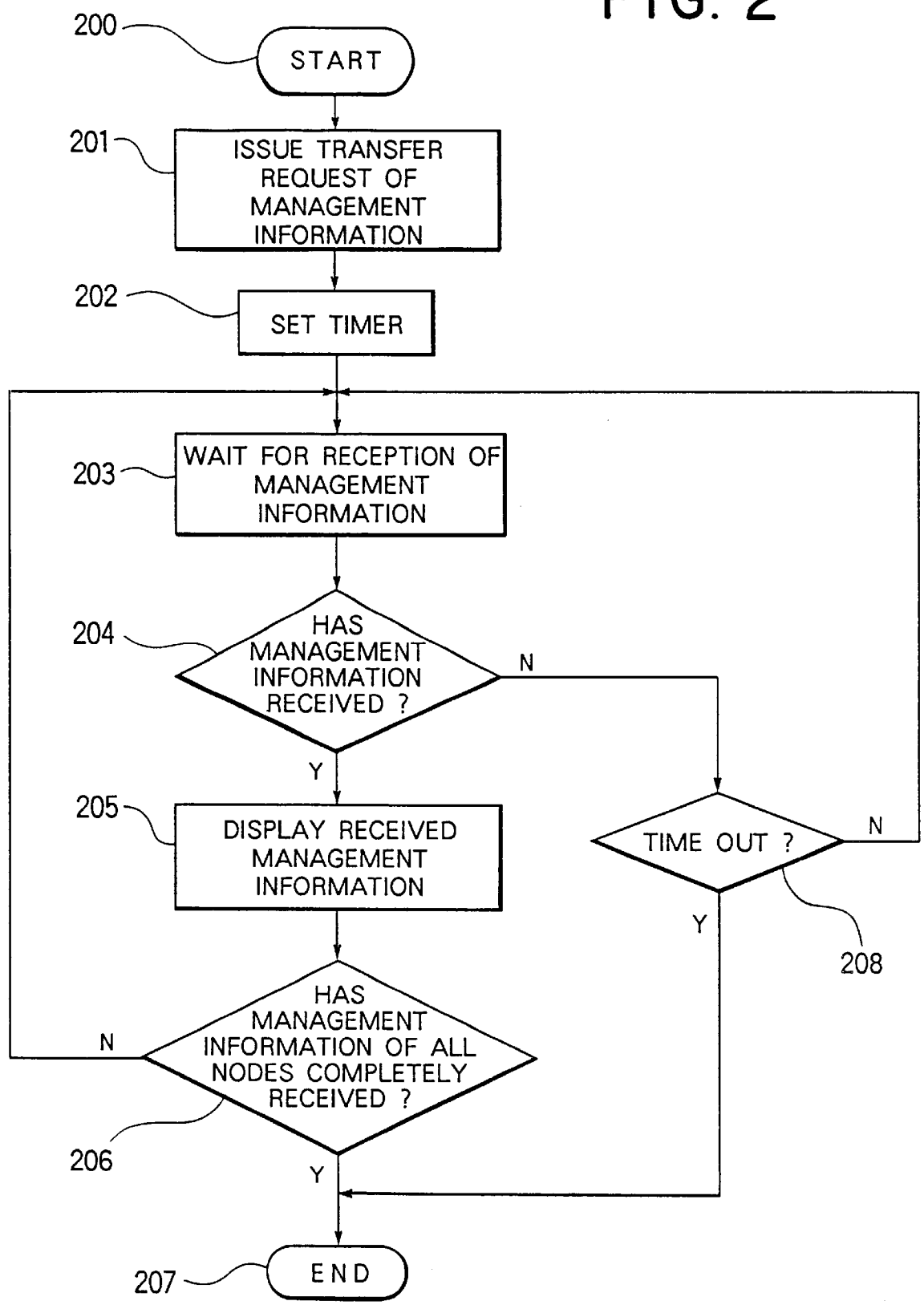
FIG. 2 is a flowchart showing operation of a process monitor of FIG. 1.

Now, by referring to a flowchart of FIG. 2, operation of the process monitor 108 will be described.

When the user designates a node which stores necessary information as the object node from the CRT/keyboard terminal 106, the process monitor 108 is started (in step 200).

When the process monitor 108 is started, it issues a transfer request of the management information to the process status server 110 on the object node through the communication medium 100 (in step 201).

Then, to prevent a dead lock of the system from taking place when a communication error occurs, a timer is set (in step 202).

After that, the process monitor 108 waits until the process status server 110 on the object node sends the management information (in step 203).

The process monitor 108 determines whether or not it has received the management information (in step 204). When the process monitor 108 has received the management information, that is, the determined condition is YES, it displays the received management information on the CRT/keyboard terminal 106 (in step 205). After that, the process monitor 108 determines whether or not it has completely received the management information of all the object nodes (in step 206).

When the process monitor 108 has completely received the management information of all the object nodes, that is, the determined condition is YES, it completes the operation (in step 207). On the other hand, when the process monitor 108 has not completely received the management information of all the object nodes, that is, the determined condition is NO, the process monitor 108 waits until the process status server 110 sends the management information (in step 203).

When the process monitor 108 has not received the management information (in step 204), that is, the determined condition is NO, it determines whether or not the time out takes place (in step 208). When the time out does not take place, the process monitor 108 waits until the process status server 110 sends the management information (in step 203). On the other hand, when the time out takes place, that is, the determined condition is YES, the process monitor 108 completes the operation (in step 207).

Figure 3:
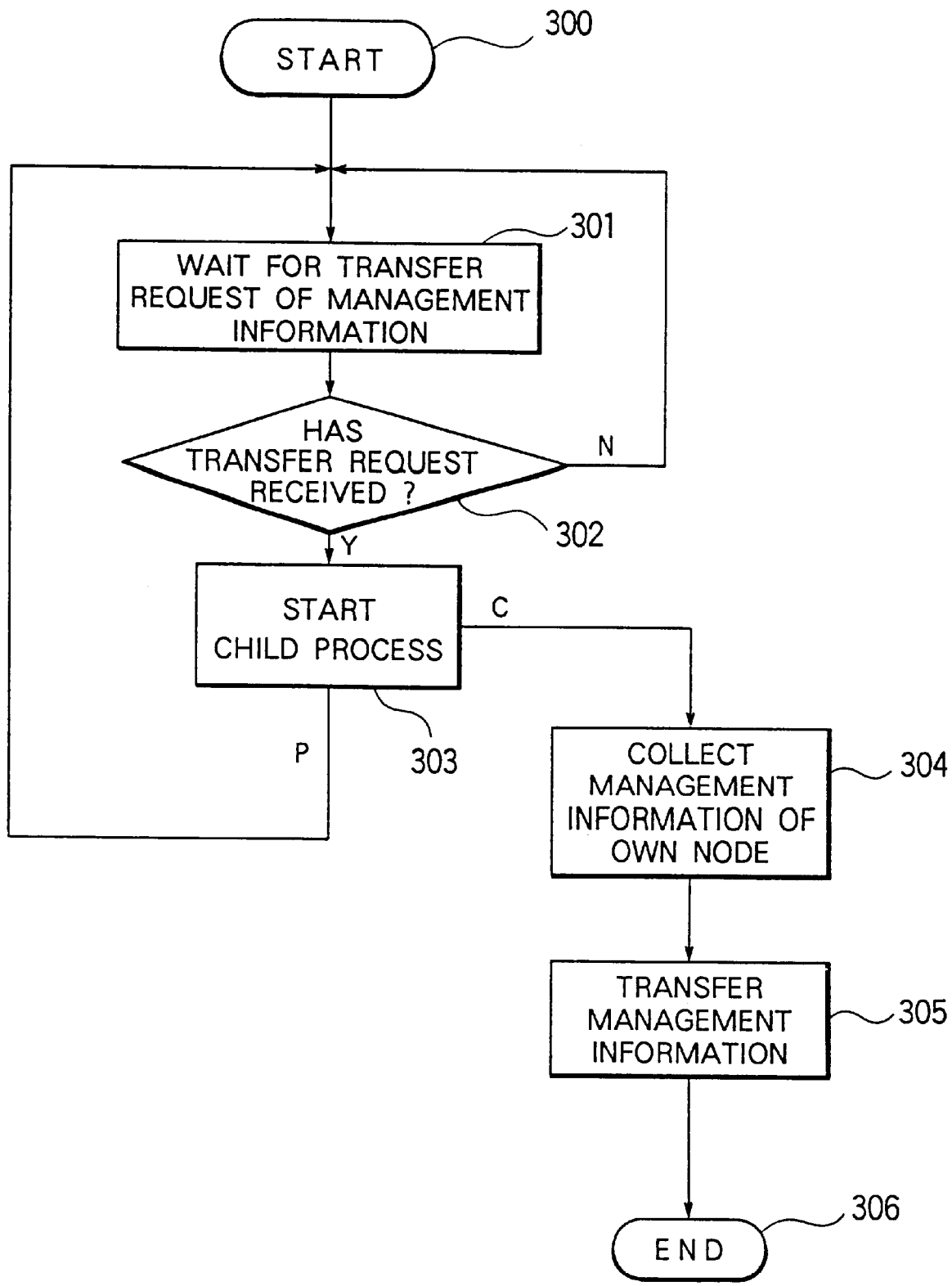
FIG. 3 is a flowchart showing operation of a process status server of FIG. 1.

Now, by referring to a flowchart of FIG. 3, operation of the process status server 110 will be described.

When the computer system 102 is started, the process status server 110 is automatically started and resides in the computer system 102 (in step 300).

The process status server 110 waits until the process monitor 108 issues a transfer request of the management information (in step 301) and determines whether or not the process status server 110 has received the transfer request (in step 302).

As the result of the above determination, when the process status server 110 has not received the transfer request, that is, the determined condition is NO, it waits until the process monitor 108 issues the transfer request (in step 301). On the other hand, when the process status server 110 has received the transfer request, that is, the determined condition is YES, it starts a child process (in step 303).

After that, the parent process of the process status server 110 waits until the process monitor 108 issues the transfer request of the management information (in step 301).

The child process accesses a table (on a disk or a memory) which is controlled by the OS (operating system) and collects the management information of its own node (in step 304). After that, the child process transfers the collected management information to the process monitor 108 which requested it through the communication medium 100 (in step 305) and completes the operation (in step 306).

As described above, in the process status server 110, the parent process only receives service requests and the child process executes actual services. Thus, the services can be smoothly executed.

The management information includes the user information, which is information of the user who is using the object node, process information, which is information with respect to the processes started on the object node, and so forth. As the above user information, for example, there are user names who are logging in, remote source machine names that the users are logging in (in the case of remote log-in operation), terminal names that the users are using, user log-in time, and so forth.

FIG. 4 shows a communication procedure accomplished between the process monitor 108 and the process status server 110.

As shown in FIG. 4, the process status server 110 is automatically started when each machine is started (in step 401). After that, the process status server 110 waits until the process monitor 108 issues a request (in step 402).

On the other hand, the user starts the process monitor 108 from the CRT/keyboard terminal 106 when necessary (in step 411). When the user designates a computer system from which he or she wants to obtain necessary information as an object node, the process monitor 108 issues a transfer request of the management information to the process status server 110 (in step 412) and waits until the process status server 110 sends the management information (in step 413).

When the process status server 110 receives the transfer request from the process monitor 108 (in step 403), it starts the child process (in step 404) and waits until the process monitor 108 issues the request (in step 402). On the other hand, the child process which was started collects its own management information, transfers the collected management information to the process monitor 108 on the node which issued the request through the communication medium 100 (in step 405), and completes the operation (in step 406).

On the other hand, when the process monitor 108 receives the management information being transferred in the manner described above (in step 414), it displays the received management information on the CRT/keyboard terminal 106 (in step 415), and completes the operation (in step 416).

The process status server 110 starts the child process as described above (in step 404) and waits until the process monitor 108 issues the request (in step 402). For example, when the process status server 110 receives the transfer request from another process monitor (B) 108 (in step 403), it starts the child process (in step 404) and waits until the process monitor 108 issues the request in the same manner as described above.

As described above, a pair of the process monitor 108 and the process status server 110 mutually respond to each other through the communication medium 100 and exchange information.

As described above, in the present invention, a transfer request of management information is issued from any node to another node. When one node receives the transfer request, it collects its own management information and transfers it to another node which requested it. The node which received the management information outputs it on CRT or writes it on a disk.

In other words, each node in the network acts as two different types of parties named a client and a server through services for collecting and transferring information. The client is a party which requests another node in the network to execute a service, while the server is a party which receives a service request from another node and executes the service.

Moreover, any node in the network can collect all information in the entire network from all the nodes therein by using a broadcast which is a means for simultaneously requesting all the nodes to execute a service.

Thus, when any node in the network becomes a client node, the user can access the management information of the network from any node.

In addition, since the management information is collected and transferred in the unit of a node, it can be monitored from nodes which are currently active in the network irrespective of the states of particular nodes, that is, they are defective, inactive, and so forth.

What is claimed is:

1. A computer network system comprising a plurality of nodes connected through a communication medium to each other, each of said plurality of nodes having a computer system, the computer system comprising a process monitor, a process status server, and a display wherein said process monitor is coupled to said communication medium, including first means for issuing a transfer request of management information to said process status server on a different node through said communication medium, and second means for receiving the management information sent from said process status server on the different node;

said process status server is connected to said process monitor, including at least a first collecting means for collecting the management information in the process status server's own node, said management information at least containing user names who are logging in, terminal names that the users are using and user log-in time, and third means for activating said first collecting means when said transfer request of the management information is received through said communication medium and for transferring the management information in its own node being collected by said first collecting means, to the process monitor which issued said transfer request through said communication medium; and said display device is associated with said second means of said process monitor for displaying said management information transferred from said process status server on the different node, wherein said third means waits for said transfer request from another different node and activates a second collecting means for simultaneously collecting said own management information for transferring the own management information, being collected by said second collecting means, to the process monitor of the another different node which issued said transfer request through said communication medium.

2. The computer network as set forth in claim 1, wherein the process status server is automatically started and resides in the respective computer node when the respective computer node is started.

3. The computer network as set forth in claim 1, wherein each of said process monitor further comprises:
   a timer being set when the transfer request is issued by said first means and timing out when said second means does not receive management information to be sent from said process status server on the different node within a predetermined time period; and
   a cancellation means for canceling the transfer request when the timer times out.

4. The network as set forth in claim 1, wherein the transfer request issued by the first means is a broadcast request for simultaneously requesting management information from all other nodes in the network.

5. A computer network system comprising a plurality of nodes connected through a communication medium to each other, each of said plurality of nodes having a computer system, the computer system comprising a process monitor, a process status server, and a display, wherein
   said process monitor is coupled to said communication medium, including first means for issuing a transfer request of management information to said process status server on a different node through said communication medium, and second means for receiving the management information sent from said process status server on the different node;
   said display device is associated with said second means of said process monitor for displaying said management information transferred from said process status server on the different node; and
   said process status server is connected to said process monitor, including third means for receiving said transfer request and fourth means for starting a child process which can operate in parallel with the said operation of said third means,
   wherein said child process comprises
   at least a first and second collecting means for collecting the management information in process status server's own node, said management information at least containing user names who are logging in, terminal names that the users are using and user log-in time,
   fifth means for activating said first collecting means and said second collecting means when said third means receives multiple transfer requests of the management information from different process monitors through said communication medium and said fifth means for further transferring the management information in its own node being collected by said first and second collecting means, to the appropriate process monitor which issued said transfer request through said communication medium.

6. The computer network as set forth in claim 5, wherein the process status server is automatically started and resides in the respective computer node when the respective computer node is started.

7. The computer network as set forth in claim 5, wherein each process monitor further comprises:
   a timer being set when said transfer request is issued by the first means and timing out when the second means does not receive management information to be sent from said process status server on the different node within a predetermined time period; and
   a cancel means for canceling the transfer request when the timer times out.

8. The computer network as set forth in claim 5, wherein the request issued by the first means is a broadcast request for simultaneously requesting management information from all other computer nodes in the network.

9. A network including a plurality of nodes, each respective node comprising both a client function and a server function, wherein
   said client function is coupled to a communication medium, including first means for issuing a transfer request of management information to said process status server on a different node through said communication medium, and second means for receiving the management information sent from said process status server on the different node; and
   said server function is connected to said first means, including a plurality of collecting means for collecting the management information in the process status server's own node, said management information at least containing user names who are logging in, terminal names that the users are using and user log-in time, and third means for activating at least one of said plurality of collecting means when more than one transfer request from different first means of the management information is received through said communication medium and for transferring the management information in its own node being collected by said plurality of collecting means, to the first means of the node which issued said transfer request through said communication medium.

10. A method of retrieving management information from computer nodes in a system comprising a plurality of computer nodes connected to each other through a communication medium, each of said plurality of computer nodes comprising both a client process and a server process;
   wherein the client process performs the steps of
   issuing a transfer request of management information to another of the plurality of computer nodes through the communication medium; and
   receiving the management information issued from another computer node through the communication medium; and
   wherein the server process performs the steps of
   receiving a plurality of transfer requests from said plurality of computer nodes through the communication medium;
   collecting the management information in its own node, said management information at least containing user names who are logging in, terminal names that the users are using and user log-in time, when said transfer request of management information is received through said communication medium; and
   transmitting the collected management information in its own node to each of said plurality of computer nodes through the communication medium that requested the transfer.

11. The method as set forth in claim 10, wherein the server process is automatically started and resides in the respective computer node when the respective computer node is started.

12. The method as set forth in claim 10, wherein the client process further performs the step of:

canceling said transfer request when management information is not received from the computer node within a predetermined time period.

13. A method of retrieving management information from computer nodes in a system comprising a plurality of computer nodes connected to each other through a communication medium, each of said plurality of computer nodes comprising both a client process and a server process;

wherein the client process performs the steps of issuing a transfer request of management information to another of the plurality of computer nodes through the communication medium; and receiving the management information issued from another computer node through the communication medium;

wherein the server process performs the steps of receiving multiple transfer requests from the plurality of computer nodes through the communication medium; and starting a plurality of child process which can operate in parallel with each other and the operation of the server process when said transfer request of management information is received through said communication medium, wherein each of said plurality of child process performs the steps of collecting the management information in its own node, said management information at least containing user names who are logging in, terminal names that the users are using and user log-in time, and transmitting the collected management information in its own node through the communication medium to each of said computer nodes that requested the transfer.

14. The method as set forth in claim 13, wherein the server process is automatically started and resides in the respective computer node when the respective computer node is started.

15. The method as set forth in claim 13, wherein the client process further performs the step of:

canceling said transfer request when management information is not received from the computer node within a predetermined time period.

* * * * *